(12) United States Patent
Chikosi

(10) Patent No.: US 7,001,876 B2
(45) Date of Patent: Feb. 21, 2006

(54) WALLPAPER STRIPPING COMPOSITION

(76) Inventor: Stephen Chikosi, 46 Mullaghacall Crescent, Portstewart County Londonberry BT55 7EL Northern Ireland (GB)

( * ) Notice: Subject to any disclaimer, the term of this patent is extended or adjusted under 35 U.S.C. 154(b) by 204 days.

(21) Appl. No.: 10/264,116

(22) Filed: Oct. 3, 2002

(65) Prior Publication Data

US 2003/0119687 A1   Jun. 26, 2003

(30) Foreign Application Priority Data

Oct. 3, 2001   (GB)   .................................. 0123692

(51) Int. Cl.
  *C11D 77/04*   (2006.01)
  *C11D 3/00*   (2006.01)
  *C11D 3/395*   (2006.01)

(52) U.S. Cl. ...................... 510/200; 510/320

(58) Field of Classification Search ................ 500/200, 500/367, 320
  See application file for complete search history.

(56) References Cited

U.S. PATENT DOCUMENTS

| | | | |
|---|---|---|---|
| 4,164,477 A | 8/1979 | Whitley | |
| 4,793,942 A | 12/1988 | Lokkesmoe | |
| 5,200,236 A * | 4/1993 | Lang et al. | 427/213 |
| 5,215,675 A * | 6/1993 | Wilkins et al. | 510/206 |
| 5,372,740 A | 12/1994 | Fair et al. | 252/135 |
| 5,436,008 A | 7/1995 | Richter et al. | |
| 5,531,919 A | 7/1996 | Russo et al. | 510/200 |
| 5,643,861 A | 7/1997 | de Guertechin et al. | |
| 6,169,061 B1 * | 1/2001 | Machac et al. | 510/201 |
| 6,239,090 B1 * | 5/2001 | Marquis et al. | 510/201 |
| 6,423,674 B1 | 7/2002 | Williams et al. | |

FOREIGN PATENT DOCUMENTS

| | | |
|---|---|---|
| EP | 0171659 | 2/1986 |
| EP | 0407952 | 1/1991 |
| EP | 0612819 | 8/1994 |
| GB | 2054634 | 2/1981 |
| NL | DD 234645 A1 | 4/1986 |

* cited by examiner

*Primary Examiner*—Yogendra N. Gupta
*Assistant Examiner*—John M. Petruncio
(74) *Attorney, Agent, or Firm*—Van Dyke, Gardner, Linn & Burkhart, LLP

(57) ABSTRACT

The present invention relates to a wallpaper stripping composition and a concentrate therefor.

The composition and the concentrate each comprise a phosphate salt or a mixture thereof; an oxidizing agent or a mixture thereof; the phosphate salt and the oxidizing agent forming a substantially shelf-stable oxidant source; a humectant or a mixture thereof and a compatible liquid or a mixture thereof.

The wallpaper stripping compositions are useful in removing wallpaper.

16 Claims, No Drawings

WALLPAPER STRIPPING COMPOSITION

The present invention relates to a wallpaper stripping composition and its concentrate.

According to a first aspect of the invention there is provided a wallpaper stripping composition, which composition comprises a phosphate salt or a mixture thereof; an oxidising agent or a mixture thereof, preferably selected from a hypohalite, a hydroperoxide, a perhalate and a permanganate or a mixture thereof, the, or each, phosphate salt and the, or each, oxidising agent forming a substantially shelf-stable oxidant source; a humectant or a mixture thereof; and a compatible liquid or a mixture thereof.

By the term "substantially shelf-stable" is meant that greater than 50%, preferably greater than 75% of the oxidising activity of the oxidising agent still exists after 3 months storage at room temperature (20–25° C.).

The term "compatible", when referring to the liquid, means a liquid both which does not, of itself, destabilise the other ingredients of the wallpaper stripping composition and which is of low, or no, toxicity if accidentally contacted with the skin of a human user. Preferably, the liquid is water, any alcohol, or a mixture thereof. The remaining ingredients are dissolved or suspended, preferably dissolved, in the liquid.

The term "hydroperoxide" includes hydrogen peroxide and mono and di salts thereof, including, but not limited to, disodium peroxide and dipotassium peroxide.

The term "perhalate" includes perchlorate and equivalent derivatives of other halogens.

By the term "hypohalite" is meant any salt of a hypohalous acid, or a mixture thereof. Preferably, the hypohalous acid is selected from hypofluorous, hypochlorous, hypobromous and hypoiodous acids, or a mixture thereof. Preferably, the salt is a monovalent cation, preferably an alkali metal, more preferably a sodium or potassium cation. The oxidising activity of the hypohalite may comprise the hypohalite anion or free hypohalous acid, or a mixture thereof. Alternatively, the hypohalite may be formed, in use, in the concentrate of the second aspect of the invention or in the composition of the first aspect of the invention, from any suitable precursor. Hypohalites are the preferrred oxidising agent.

Preferably, the substantially shelf-stable oxidant source includes a monovalent salt of any hypohalous acid, or a mixture thereof, as the hypohalite and, optionally, a source of cations.

More preferably, the, or each salt of the hypohalous acid is an alkali metal salt and the source of cations is a source of alkali metal cations. Alternatively, the or each salt of the hypohalous acid is an alkaline earth salt and the source of cations is a source of alkaline earth cations. Further alternatively, the or each salt of the hypohalous acid is any monovalent cation and the source of cations is any monovalent cation. In each case, the respective cations may be the same or different.

More preferably, the phosphate salt comprises a mono, di, tri or polybasic salt of an ortho, meta, pyro or poly phosphoric acid with a monovalent or a divalent cation. The monovalent cation may be selected from alkali metals, further selected from, for example, sodium and potassium and the divalent cation may be selected from alkaline earth cations, further selected from magnesium or calcium. The phosphoric acid may be a simple phosphoric acid selected from ortho phosphoric acid or meta phosphoric acid, more preferably selected from salts thereof with any monovalent or divalent cation, or a condensed phosphoric acid selected from pyrophosphoric acid, hexametaphosphoric acid and polyphosphoric acids, more preferably from salts with a monovalent or divalent cation, even more preferably sodium, potassium or calcium. If the phosphate salt is a pyrophosphate, mono, di, tri and tetra salts with a monovalent cation such as sodium are envisaged.

The humectant is a hygroscopic (absorbs atmospheric water) or deliquescent (absorbs atmospheric water and dissolves in the water thus absorbed) compound, preferably a hygroscopic or deliquescent, dihydric or a polyhydric compound. By "dihydric" is meant containing two hydroxyl groups and, by "polyhydric" is meant containing three or more hydroxyl groups.

More advantageously, the humectant is a mono, di or trisaccharide or an alcohol derivative thereof. The humectant may be monosaccharide, selected from aldoses and ketoses, which may contain four carbons (tetroses), five carbons (pentoses), six carbons (hexoses), seven carbons (heptoses) and eight carbons (octoses), each of which exist in two series, namely, as aldoses and as ketoses. Examples of tetroses include erythrose, threose and erythrulose. Examples of pentoses include ribose, arabinose, xylose, lyxose, ribulose and xylulose. Examples of hexoses include allose, altrose, glucose, mannose, gulose, idose, galactose, talose, psicose, fructose, sorbose and tagatose. Examples of alcohol derivatives thereof include sorbitol, mannitol and xylitol. Examples of suitable disaccharides include sucrose, maltose, lactose, cellobiose, gentiobiose, lactulose and trehalose. Examples of suitable trisaccharides include raffinose and melezitose. Mixtures of suitable mono-, di- and trisaccharides and their sugar alcohols are also contemplated. Further contemplated are syrups derived from, for example, corn starch. Such corn syrups contain a mixture of various monosaccharides, including fructose.

Alternatively or additionally, the humectant is a hygroscopic or deliquescent, linear or branched, dihydric or polyhydric compound. Suitable dihydric compounds include glycols such as propylene glycol and triethylene glycol. Suitable trihydric compounds include hexan-1,2,6-triol and suitable polyhydric compounds include polypropylene glycols and polyethylene glycols such as polyethylene glycol 200, 300 and 1540, of which polyethylene glycols, the lower molecular weight polyethylene glycols are preferred.

Preferably, the source of alkali metal cations is an electrolyte, preferably an alkali metal halide, more preferably selected from an alkali metal fluoride, chloride, bromide or iodide, still more preferably selected from sodium chloride and potassium chloride, or a mixture thereof.

By the term "electrolyte" is meant any compound that partially or completely ionises, when dissolved in the solvent.

More preferably, the wallpaper stripping composition has a pH of 8–12, still more preferably a pH of 9–11 and most preferably a pH of about 9.5.

According to a second aspect of the invention there is provided a concentrate for a wallpaper stripping composition, which concentrate comprises a substantially shelf-stable oxidant source, the oxidant source comprising a phosphate salt or a mixture thereof and an oxidising agent or a mixture thereof, the oxidising agent being preferably selected from a hypohalite, a hydroperoxide, a perhalate and a permanganate or a mixture thereof; a humectant or a mixture thereof; and a compatible liquid or a mixture thereof, the concentrate being such that, on dilution thereof with a liquid, it forms a composition according to the first aspect of the invention.

When the oxidising agent is a hypohalite, it is believed that the phosphate salt(s) acts as a "chelate" for the hypohalite, (for example, the alkali metal salt of hypohalous acid)

thereby providing a substantially shelf-stable source of hypohalite as oxidising agent. It is also believed that the "chelate" of the phosphate salt and hypohalite, which is believed to be formed in aqueous solution, can be hydrated and that, if so hydrated, the water ligands of the "chelate" may act as a vehicle carrier for the humectant(s). A preferred phosphate salt is a tribasic salt of ortho phosphoric acid, specifically, $Na_3PO_4.12H_2O$. The oxidising power of the hypohalite element of the "chelate" assists in weakening the adhesive bond of wallpaper paste. It is preferred that the hypohalite salt be selected from sodium or potassium salts of hypofluorous, hypochlorous, hypobromous and hypoiodous acids. NaOCl is a most preferred hypohalite. The hypohalite element also preserves the humectant, by preventing its fermentation by yeast or the like. The presence of the source of alkali metal cations is believed to suppress the dissociation of the hypohalite under the following representative reaction scheme:

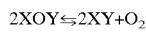

in which X represents an alkali metal cation and Y represents a halide anion. If the source of alkali metal cations comprises an alkali metal halide, as is preferred, the presence of excess alkali metal halide would suppress the dissociation of hypohalite and, thereby, further stabilise the "chelate" by the common ion effect. In addition, it is believed that the source of alkali metal cations can also act as a thickener, giving body to the wallpaper stripping composition and reducing the rate of evaporation of the composition from the wallpaper surface.

It is believed that the pH of the wallpaper stripping composition according to the invention should be in the range 8–12, more preferably 9–11, most preferably about 9.5 to facilitate formation of the above-mentioned "chelate". In addition, it is believed that the preferred pH range of 8–12 contributes to encouraging or enhancing the stability of the "chelate", in terms of retarding dissociation of the hypohalite from the above-mentioned "chelate".

The humectant(s) of the wallpaper stripping composition of the invention is added to ensure that water is absorbed into and through the wallpaper and to retard water evaporation from the wallpaper. Preferred humectants include dihydric alcohols and polyhydric alcohols. Examples of suitable dihydric and polyhydric alcohols include glycerol, propylene glycol, polyglycols such as polyethylene glycol and polypropylene glycol and mono-, di- and tri-saccharides or a mixture thereof. The saccharides are the preferred humectants, sucrose or glucose being the most preferred humectants.

A surfactant may be added to the wallpaper stripping composition of the invention, to stabilise the composition and to act as a wetting agent. Any suitable surfactant may be used, for example, nonionic, anionic, cationic or amphoteric surfactants. Sodium salts of higher secondary alkyl sulphates such as those sold under the Trade Mark Teepol are preferred.

A soap (anionic surfactant) may be added to the wallpaper stripping composition of the invention, to act as a sud-controlling agent and to maintain the ionic ratio in an anionic bias. It is believed that this anionic environment may enhance the stability of the composition. For this reason, of the various surfactants, compatible anionic surfactants are preferred.

Other additives can be added, if desired, for example, preservatives such as, for example, bactericides and fungicides, fragrances and dyes.

The amounts and types of the various ingredients in the wallpaper stripping composition of the invention vary according to use. For optimum results, the preferred concentrate contains from about 0.2 to about 5% (w/v) of the phosphate salt, from about 1 to about 30% (w/v) of the humectant, from about 0.1 to about 1.0% (w/v) of the hypohalite, water as the liquid and from about 2 to about 10% (w/v) of the electrolyte as the source of alkali metal cations. This preferred concentrate can be diluted further with water. Desired dilutions (with water) would be 1 volume of concentrate, to a final working composition of a total of 10–30 volumes.

Method of Use of Wallpaper Stripping Compositions of the Present Invention

The composition according to the present invention can be applied to wallpaper in any conventional manner such as by brush, roller, sponge, cloth or by spraying the wallpaper stripping composition of the invention onto the wallpaper. However, it should be coated onto the wallpaper in an amount sufficient to permit adequate soaking and penetration of the wallpaper. After application, the composition of the present invention penetrates into the wallpaper, softening the adhesive of the wallpaper paste, so that the wallpaper is easily removed about 30 minutes later by either scraping or peeling. The wallpaper stripping composition of the present invention is effective in softening conventional wallpaper pastes including, for example, pastes such as a mixture of wheat paste and molasses or adhesives based on acrylics, methylcellulose, carboxymethyl cellulose, starch or mixtures thereof. The wallpaper stripping compositions of the invention are effective in stripping the conventional types of wallpaper, namely, wallpaper consisting solely of a paper backing; wallpaper consisting of a paper backing and a vinyl or acrylic layer coated over the paper backing; and wallpaper consisting of a vinyl film laminated onto a paper or fabric backing.

The invention will now be described in greater detail, with reference to the accompanying Examples. All percentages, unless otherwise specifically stated, are w/v (i.e., weight per volume).

EXAMPLE 1

General Process for Preparing a Wallpaper Stripping Concentrate

The wallpaper stripping concentrate composition according to the second aspect of the present invention is formulated by mixing the ingredients together, starting with the major ingredients in weight order, followed by the minor ingredients in weight order and the trace ingredients. The ingredients should be mixed thoroughly enough to ensure that the solid ingredients are well mixed with the liquid ingredients. The appropriate volume of water at a temperature of 50–100° C. is then added carefully, whilst stirring the mixture gently, under an extractor fan or fume hood—the reaction releases fumes which irritate the eyes. The mixture is stirred gently until effervescence subsides and is then allowed to cool to room temperature. The resultant solution is a concentrate of the wallpaper stripping composition according to the invention. In the Table 2 below (Example 3) are given the appropriate concentrations for the wallpaper stripping concentrate of the second aspect of the invention.

The concentrate of the second aspect of the present invention is subsequently diluted 1:10–30 (volume by volume (v/v)), using cold or warm water, for use as a wallpaper stripping composition of the first aspect of the present invention.

TABLE

Wallpaper Stripping Composition of the First Aspect of the Invention

| Ingredient | Preferred Concentration Range (% (w/v)) | Most Preferred Concentration (% (w/v)) | More Preferred Concentration (% (w/v)) |
|---|---|---|---|
| Phosphate Salt | 0.01–0.25 | about 0.1 | 0.05–0.2 |
| Humectant | 0.05–1.5 | 0.35–0.75 | 0.3–1.0 |
| Hypohalite Salt | 0.005–0.05 | about 0.025 | 0.01–0.05 |
| Electrolyte | 0.1–0.5 | 0.2–0.3 | 0.15–0.5 |
| Surfactant | 0.05–0.6 | 0.2–0.3 | 0.15 0.5 |
| Soap | 0.005–0.05 | | |
| Polycarboxylate | 0.002–0.05 | about 0.01 | 0.005–0.02 |
| Phosphonate | 0.002–0.05 | about 0.01 | 0.005–0.02 |
| Strong base (NaOH or KOH) | 0.0005–0.005 | about 0.0025 | 0.0015–0.005 |
| Biological Enzyme | Trace | | |
| Perfumes & Dyes | Trace | | |

It will be appreciated that the most preferred concentration ranges for the wallpaper stripping composition of the present invention, given in the middle column of the table above are more dilute than the compositions actually tested in Examples 2 and 3 hereinafter but are also efficacious in stripping wallpaper.

EXAMPLE 2

Comparison of the Efficacies of Wallpaper Stripping Compositions

The efficacies of various wallpaper stripping compositions were compared, using a scoring system from zero (in respect of tap water) to ten (in respect of the most efficacious wallpaper stripping composition of the present invention within the comparative confines (see below)) based on the relative ease of removal of test squares of wallpaper. The scoring system is a comparative score, from 0 to 10, in which a score of 0 is given to water and a score of 10 is given to the best (optimal) wallpaper stripping composition among the compositions within that comparative test. Intermediate scores are given, based on comparative ease of removal, when compared with the optimal composition within the compositions being tested. This means that a score of 10 is not an independent score but a comparative, or relative, score.

In each case, the relevant composition was diluted 1:10 (v/v) from a corresponding concentrate—Table 1 shows the actual tested, or working, conentrations. Respective 1 foot squares of vinyl wallpaper were stuck onto a plastered wall using carboxymethylcellulose wallpaper paste, 2 days beforehand. The appropriate wallpaper stripping compositions (see Table 1) were applied and were left in contact with the respective test squares of vinyl wallpaper for 15 minutes. The ease of removal of the test squares of wallpaper was then assessed on the above-mentioned scoring system. In the present example, the phosphate salt is sodium tripolyphosphate (STPP) the hypohalite is NaOCl and the saccharide is sucrose. An equivalent molar amount of tetrasodium pyrophosphate (SPP) (0.1% (w/v) SPPP is equivalent to just over 0.2% (w/v) STPP), when used in place of the sodium tripolyphosphate as the phosphate salt, yielded similar wallpaper stripping efficacy. In addition or alternatively, replacement of an equivalent molar amount of glucose, for the sucrose, as the humectant, yielded wallpaper stripping compositions of similar efficacy.

TABLE 1

INGREDIENTS

| Composition | Phosphate Salt (%) | Hypohalite (%) | Saccharide (%) | Glycerol (%) | Scoring |
|---|---|---|---|---|---|
| 1 | 0.2 | — | — | — | 1 |
| 2 | — | 0.05 | — | — | 2 |
| 3 | — | — | 0.7 | — | 1 |
| 4 | 0.2 | 0.05 | — | — | 2 |
| 5 | 0.2 | — | 0.7 | — | 1 |
| 6 | — | 0.05 | 0.7 | — | 3 |
| 7 | 0.2 | 0.05 | — | 1.0 | 5 |
| 8 | 0.2 | 0.05 | 0.7 | — | 10 |

As will be observed, the wallpaper stripping compositions according to the present invention (composition Nos. 7 & 8), show unexpectedly improved scores for wallpaper removal, when compared with comparative wallpaper stripping compositions (composition Nos. 1–6) which do not contain both a shelf-stable source of oxidising agent and a humectant.

EXAMPLE 3

A wallpaper stripping concentrate according to a second aspect of the present invention has the following composition:

TABLE 2

| Ingredient | Preferred Concentration Range (% (w/v)) | More Preferred Concentration (% (w/v)) | Most Preferred (% (w/v)) |
|---|---|---|---|
| Phosphate Salt | 0.2–5 | about 2 | 2 |
| Humectant | 1–30 | 7–15 | 10 |
| Hypohalite Salt | 0.1–1.0 | about 0.5 | 0.5 |
| Electrolyte | 2–10 | 4–6 | 5 |
| Surfactant | 1–12 | | 5 |
| Soap | 0.1–1.0 | | |
| Polycarboxylate | 0.1–1.0 | | 0.2 |
| Phosphonate | 0.1–0.5 | | 0.2 |
| Strong base (NaOH or KOH) | 0.05–0.1 | | 0.05 |
| Biological Enzyme | Trace | | Trace |
| Perfume & Dyes | <1 | | None |

It is believed that the addition of polycarboxylates may stabilise the composition and that the addition of phosphonates act as a dispersant to retard coagulation/precipitation. The presence of an alkali (strong base) may be required for pH control, whilst the incorporation of a biological enzyme may suppress fermentation.

In Table 2 above, the phosphate salt is preferably a sodium tripolyphosphate (STPP), the humectant is sucrose, the hypohalite salt is sodium hypochlorite, the electrolyte is sodium chloride and the strong base is sodium hydroxide.

The efficacies of various wallpaper stripping compositions were compared, using a scoring system from 0 (in respect of tap water) to 10 in respect of the most efficacious wallpaper stripping composition, using the scoring systems set out in Example 2.

In the present example, compositions 7 and 8 of Table 1 of Example 2 were compared with a formulation comprising a ten-fold dilution (v/v) of the most preferred concentrate in the right most column of Table 2. Specifically, the diluted composition, being tested hereinbelow, from the most preferred concentrate of the present invention comprises 0.2% (w/v) sodium tripolyphosphate, 1% (w/v) sucrose, 0.05% (w/v) sodium hypochlorite, 0.5% (w/v) sodium chloride, 0.5% (w/v) surfactant, 0.02% (w/v) polycarboxylate, 0.02% (w/v) phosphonate, 0.005% (w/v) sodium hydroxide and traces of a biological enzyme. Under the scoring system of example 2, the respective scores were 3, 6 and 10 for compositions 7 and 8 of Example 2 and this diluted test composition of Example 3.

The invention is not limited to the embodiments described or exemplified herein which may be modified or varied without departing from the scope of the invention.

The invention claimed is:

1. A wallpaper stripping composition, which composition comprises 0.01 to 0.25% by weight of a phosphate salt or a mixture thereof, an oxidising agent or a mixture thereof, the, or each, oxidising agent forming a substantially shelf-stable oxidant source, the or each oxidising agent being a hypohalite selected from the group comprising hypofluorite, hypochlorite, hypobromite and hypoiodite or a mixture thereof; a humectant or a mixture thereof; and a compatible liquid or a mixture thereof, wherein said composition is suitable for softening adhesive or wallpaper paste so that the wallpaper may be removed.

2. The wallpaper stripping composition of claim 1, in which the, or each, phosphate salt is a mono, di, tri, or polybasic salt of a simple or condensed phosphoric acid, or a mixture thereof.

3. The wallpaper stripping composition of claim 2, in which the, or each, phosphate salt is a mono, di, tri or polybasic salt of an ortho, pyro, meta or polyphosphoric acid with a monovalent or a divalent cation.

4. The wallpaper stripping composition of claim 1, in which the, or each, humectant is a hygroscopic or deliquescent compound, or a mixture thereof.

5. The wallpaper stripping composition of claim 4, in which the hygroscopic or deliquescent compound is a dihydric or a polyhydric compound, or a mixture thereof.

6. The wallpaper stripping composition of claim 4, in which the humectant is a monosaccharide, disaccharide or trisaccharide, or an alcohol derivative thereof; a linear or branched di- or polyhydric compound, or a mixture thereof.

7. The wallpaper stripping composition of claim 1, in which the composition additionally comprises a source of cations.

8. The wallpaper stripping composition of claim 7, in which the source of cations is a source of alkali metal cations.

9. A concentrate for the wallpaper stripping composition of claim 1, which concentrate comprises a wallpaper stripping composition, which concentrate comprises 0.2 to 5% by weight of a phosphate salt or a mixture thereof; an oxidising agent or a mixture thereof, the, or each, oxidising agent forming a substantially shelf-stable oxidant source, the or each oxidising agent being a hypohalite selected from the group conprising hypofluorite, hypochlorite, hypobromite and hypoiodite or a mixture thereof; a humectant or a mixture thereof; and a compatible liquid or a mixture thereof, the concentrate being such that, on dilution thereof with further liquid, it forms the composition of claim 1, wherein said composition is suitable for softening adhesive or wallpaper paste so that the wallpaper may be removed.

10. The concentrate of claim 9, in which the, or each, phosphate salt is a mono, di, tri, or polybasic salt of a simple or condensed phosphoric acid, or a mixture thereof.

11. The concentrate of claim 10, in which the, or each, phosphate salt is a mono, di, tri or polybasic salt of an ortho, pyro, meta or polyphosphoric acid with a monovalent or a divalent cation.

12. The concentrate of claim 9, in which the, or each, humectant is a hygroscopic or deliquescent compound, or a mixture thereof.

13. The concentrate of claim 12, in which the hygroscopic or deliquescent compound is a dihydric or a polyhydric compound, or a mixture thereof.

14. The concentrate of claim 12, in which the humectant is a monosaccharide, disaccharide or trisaccharide, or an alcohol derivative thereof; a linear or branched di- or polyhydric compound, or a mixture thereof.

15. The concentrate of claim 9, in which the composition additionally comprises a source of cations.

16. The concentrate of claim 15, in which the source of cations is a source of alkali metal cations.

* * * * *

UNITED STATES PATENT AND TRADEMARK OFFICE
CERTIFICATE OF CORRECTION

PATENT NO.        : 7,001,876 B2
APPLICATION NO. : 10/264116
DATED             : February 21, 2006
INVENTOR(S)       : Stephen Chikosi It is certified that error appears in the above-identified patent and that said Letters Patent is hereby corrected as shown below:

<u>Column 5:</u>
Line 67, "(SPP)" should be --(SPPP)--.

<u>Column 7:</u>
Line 17, Claim 1, "," should be --;-- after "thereof" in the first occurrence.

<u>Column 8:</u>
Line 14, Claim 9, "conprising" should be --comprising--.

Signed and Sealed this

Sixteenth Day of January, 2007

JON W. DUDAS
*Director of the United States Patent and Trademark Office*